US010509552B2

(12) United States Patent
Chadha et al.

(10) Patent No.: US 10,509,552 B2
(45) Date of Patent: Dec. 17, 2019

(54) OUTPUT DEVICE CONTROL

(71) Applicant: Oath Inc., New York, NY (US)

(72) Inventors: Sukriti Chadha, Ghaziabad (IN); Jean-Baptiste Maurice Queru, Tracy, CA (US); Darren Burton, San Jose, CA (US); Gary Moulton, Sunnyvale, CA (US); Michael Brent Shebanek, Los Gatos, CA (US)

(73) Assignee: Oath Inc., New York, NY (US)

( * ) Notice: Subject to any disclaimer, the term of this patent is extended or adjusted under 35 U.S.C. 154(b) by 0 days.

(21) Appl. No.: 15/858,328

(22) Filed: Dec. 29, 2017

(65) Prior Publication Data

US 2019/0205016 A1 Jul. 4, 2019

(51) Int. Cl.
| | | |
|---|---|---|
| G06F 17/00 | (2019.01) | |
| G06F 3/0484 | (2013.01) | |
| G06F 3/16 | (2006.01) | |
| G06F 9/451 | (2018.01) | |
| G09B 21/00 | (2006.01) | |
| G06F 3/01 | (2006.01) | |
| G06T 11/60 | (2006.01) | |

(52) U.S. Cl.
CPC .......... *G06F 3/04845* (2013.01); *G06F 3/016* (2013.01); *G06F 3/167* (2013.01); *G06F 9/453* (2018.02); *G09B 21/007* (2013.01); *G06T 11/60* (2013.01)

(58) Field of Classification Search
CPC ........ G06F 21/60; G06F 21/604; G06F 21/62; G06F 21/6218; G06F 2221/2143
See application file for complete search history.

(56) References Cited

U.S. PATENT DOCUMENTS

| | | | | |
|---|---|---|---|---|
| 8,643,951 B1* | 2/2014 | Wheeler | ................. | G06F 3/012 359/630 |
| 8,949,902 B1* | 2/2015 | Fabian-Isaacs | ...... | H04N 21/439 725/52 |
| 9,007,301 B1* | 4/2015 | Raffle | .................... | G09G 3/003 345/156 |
| 2012/0109532 A1* | 5/2012 | George | ............. | G01N 33/5061 702/19 |
| 2012/0167146 A1* | 6/2012 | Incorvia | ......... | H04N 21/234318 725/60 |
| 2015/0346955 A1* | 12/2015 | Fundament | ........ | H04N 21/4821 715/765 |
| 2016/0034114 A1* | 2/2016 | Lee | ..................... | G06F 3/04817 715/804 |
| 2016/0246498 A1* | 8/2016 | Rav-Noy | ............ | G06F 3/04883 |

\* cited by examiner

*Primary Examiner* — Di Xiao
(74) *Attorney, Agent, or Firm* — Cooper Legal Group, LLC

(57) ABSTRACT

One or more computing devices, systems, and/or methods for controlling an output device are provided. For example, features are extracted from data points of an object. A set of data points are identified from the data points based upon the set of data points having features corresponding to target features. Marker elements are assigned to the set of data points. A mapping structure is used to assign output indicators to the marker elements. The output device is controlled to provide output indicators assigned to marker elements as the marker elements become a current focus of the user navigation.

20 Claims, 11 Drawing Sheets

OUTPUT DEVICE CONTROL

BACKGROUND

Many computing devices convey information through visual information displayed on a display and/or through audible information provided through a speaker. For example, a mobile device may display a weather chart through a weather application user interface. A tablet may play an audio book through an audio user interface. In this way, various types of computing devices can convey information in various ways.

Graphical representations of data allow users to quickly get a visual summary and key markers of the data, such as a domain of the data being represented, trends, outliers, minimum values, maximum values, starting values, ending values, and a range of the data. Such graphical representations provide users with more in-depth access to data points. Unfortunately, graphical representations of data and/or other visually represented data (e.g., images, videos, a text document, a website, etc.) provide little value to visually impaired users, those who don't have immediate access to the display, etc. Some computing devices provide visually impaired users with screen reader functionality that reads displayed content through audio output. However, audio descriptions of certain types of content may be inadequate for providing a user with a full understanding of the content. This leaves the user with the difficult task of constructing a mental picture of the content based upon an audio description that merely recites what is currently displayed (e.g. line graph trending up).

SUMMARY

In accordance with the present disclosure, one or more computing devices and/or methods for controlling an output device are provided. In one embodiment, a computing device may store or provide access to an object. The object may represent information, such as a chart or graph comprising data points. It may be appreciated that any type of object comprising one or more datum points (e.g., values) may be processed. The data points of the object may be extracted, such as values extracted from data or metadata of the chart. Features are extracted from the data points, such as a minimum value, a maximum value, a trend, a change in slope such as from increasing values to decreasing values or vice versa, a first data point, a last data point, an outlier, and/or a variety of other features of data.

A set of data points are identified from the data points of the object based upon the set of data points having features corresponding to target features, such as those identified as interesting features (e.g., changes in slope, minimum values, maximum values, etc.). Marker elements, such as invisible user interface elements, are assigned to the set of data points. In one example, marker elements are assigned to every datum point of the object. In another example, marker elements are assigned to a subset of the data points of the object, such as the set of data points having the interesting features.

A mapping structure, mapping features to output indicators, is used to assign output indicators to marker elements based upon features of data points to which the marker elements are assigned. An output indicator can comprise a variety of different types of indicators, such as a vibration of a haptic sensor, an audio signal, and/or other types of output that can be provided by output devices. For example, an output indicator of an audio signal can have certain audio features corresponding to certain types of values of data points, such as different tones, melodies, instruments, volumes, pitches, frequencies, echoes, textures, etc. In this way, an audio signal can have a certain audio feature that invokes a feeling corresponding to the values of data points, such as a particular sound at a particular frequency and volume to convey a stock price dropping sharply (e.g., a sound of pots and pans dropping onto a floor).

Navigation among the marker elements is facilitated, such as through a touch screen of the computing device, voice commands spoken to the computing device, or any other type of user input. In one example, the navigation is provided through a user interface through which the object is rendered. In another example, the navigation is provided separate of the object, such as where the object is a chart file not displayed on the computing device but is stored within storage of the computing device. An output device, such as an audio device or a haptic device array, is controlled to provide output indicators assigned to marker elements as the marker elements become the current focus of the user input (e.g., the current focus may be a region of the display underneath a finger of the user). In this way, the user can gesture, swipe, or perform other input to navigate between marker elements in order to have corresponding output indicators provided to the user. Based upon the speed of the user's navigation, a macro view (e.g., zoom out to a larger granular view of the chart) or a micro view (e.g., zoom into a particular region of the chart for a finer granular view of the chart) of the object is provided.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be used and/or implemented.

1.1. Networking

Figure 1:
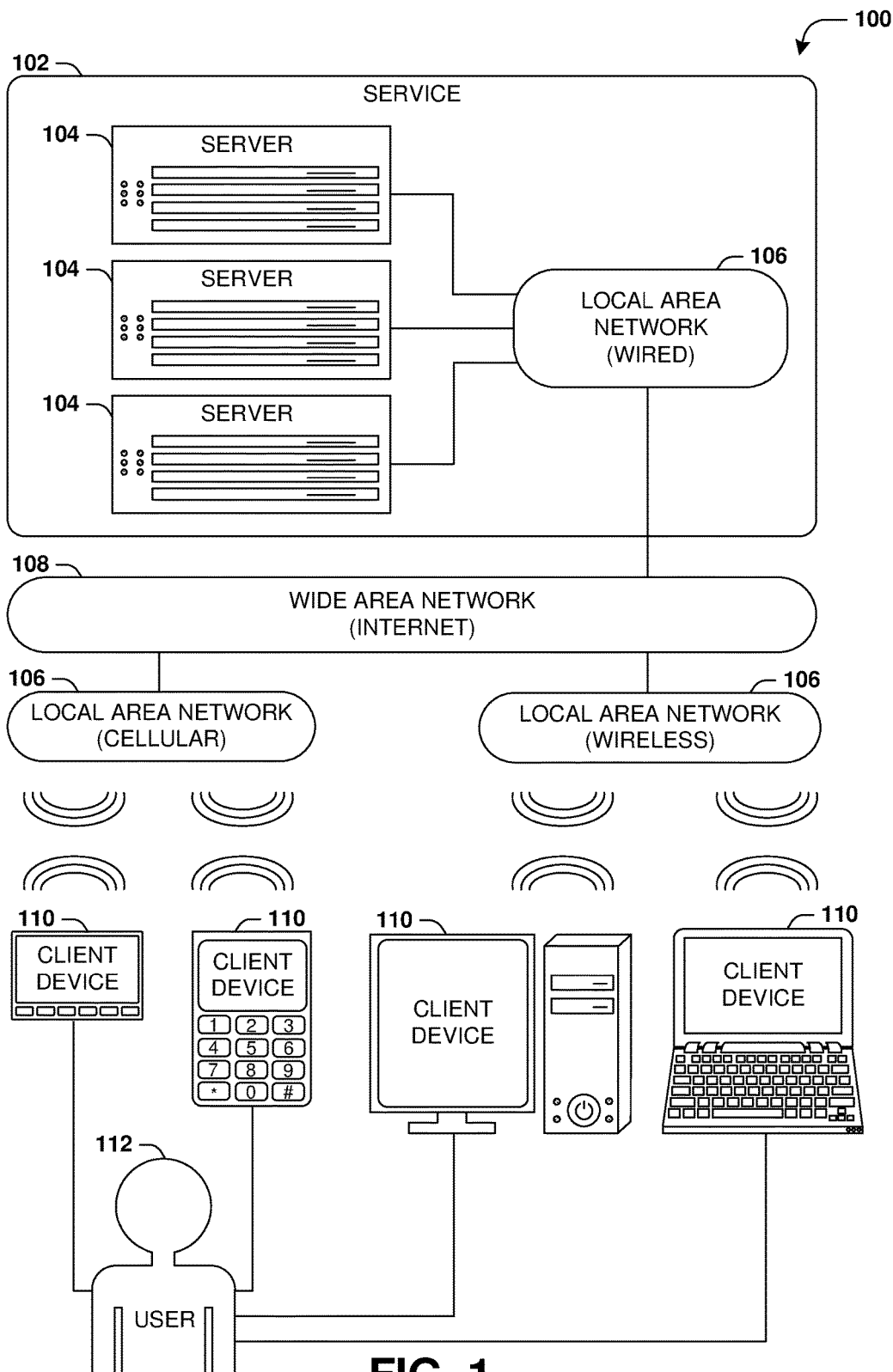
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may use a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
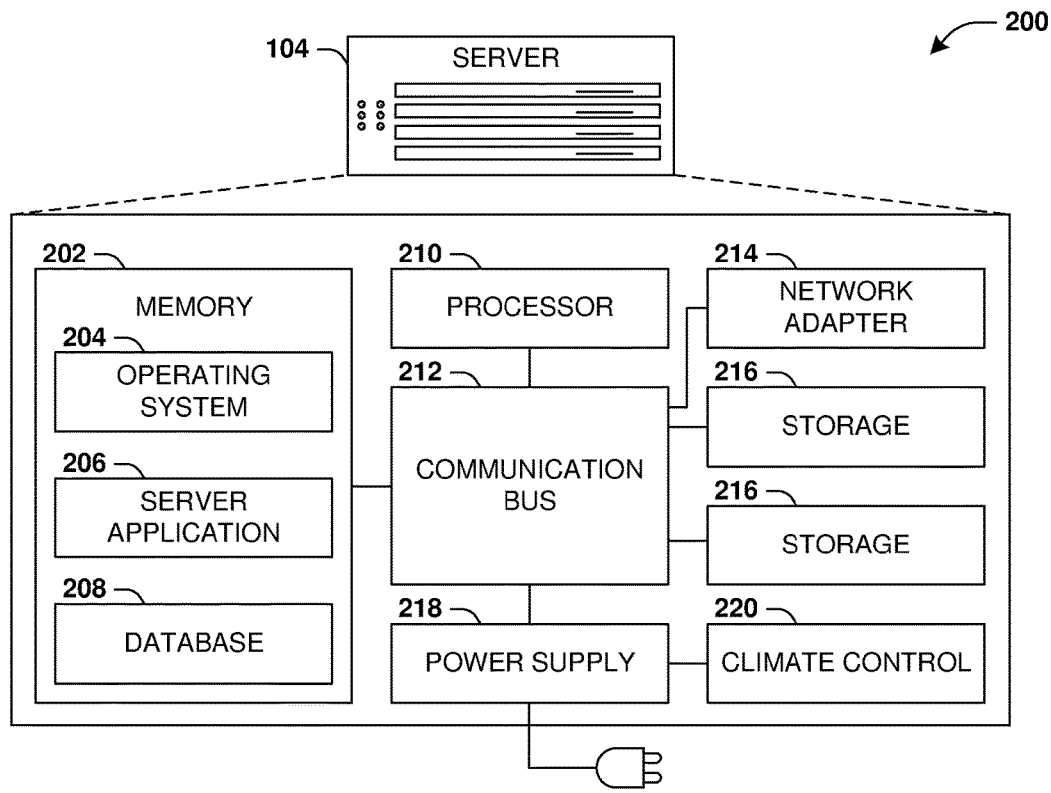
FIG. 2 is an illustration of a scenario involving an example configuration of a server that may use and/or implement at least a portion of the techniques presented herein.

FIG. 2 presents a schematic architecture diagram 200 of a server 104 that may use at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to use at least a portion of the techniques presented herein.

1.3. Client Device Configuration

Figure 3:
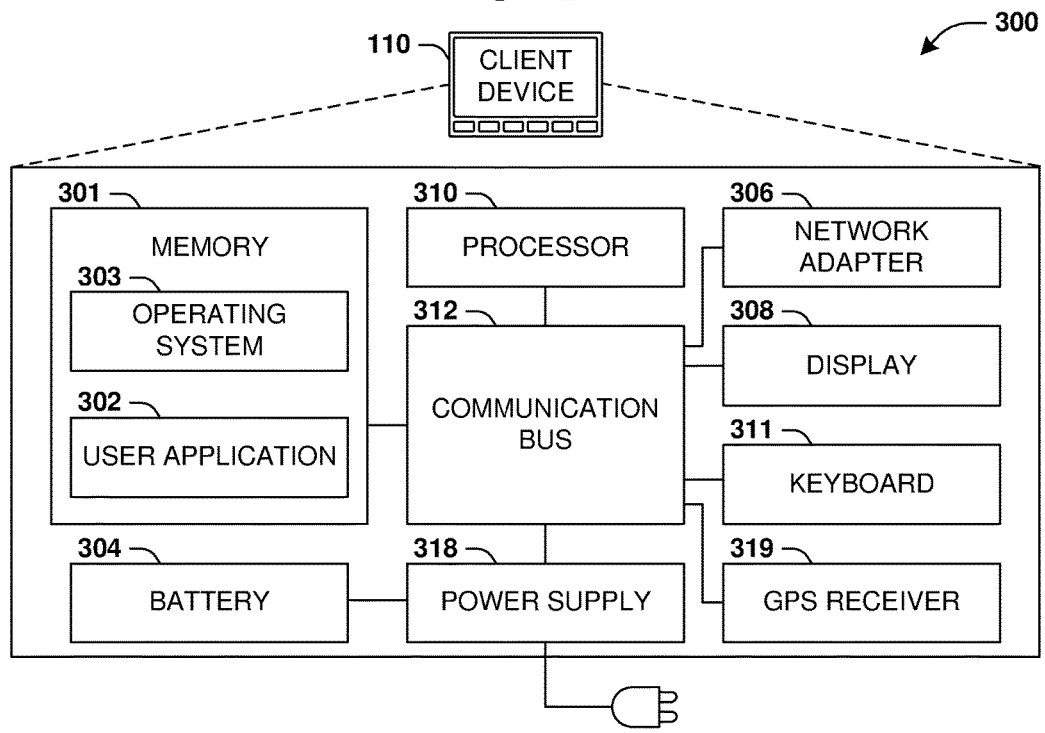
FIG. 3 is an illustration of a scenario involving an example configuration of a client that may use and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a haptic feedback array, a sound adapter coupled with a speaker, and/or a printer; input devices for receiving input from the user, such as a keyboard 311, a tactile feedback sensor, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to use at least a portion of the techniques presented herein.

2. Presented Techniques

One or more computing devices and/or techniques for controlling an output device is provided. The output device, such as an audio device or haptic device, is controlled to provide output indicators used to convey information relating to data points of an object, such as a chart or graph. Such techniques improve the ability of visually impaired users and/or other users to interact with information conveyed through a computing device, such as an improved ability to understand dense information such as the ability to understand trends of data points within a graph or chart. Particular sounds, volume levels, pitches, instruments, songs, melodies, textures, tones, and/or other audio signal features can be used to convey emotional information associated with the data points, such as a sharp rise in a stock price.

Figure 4:
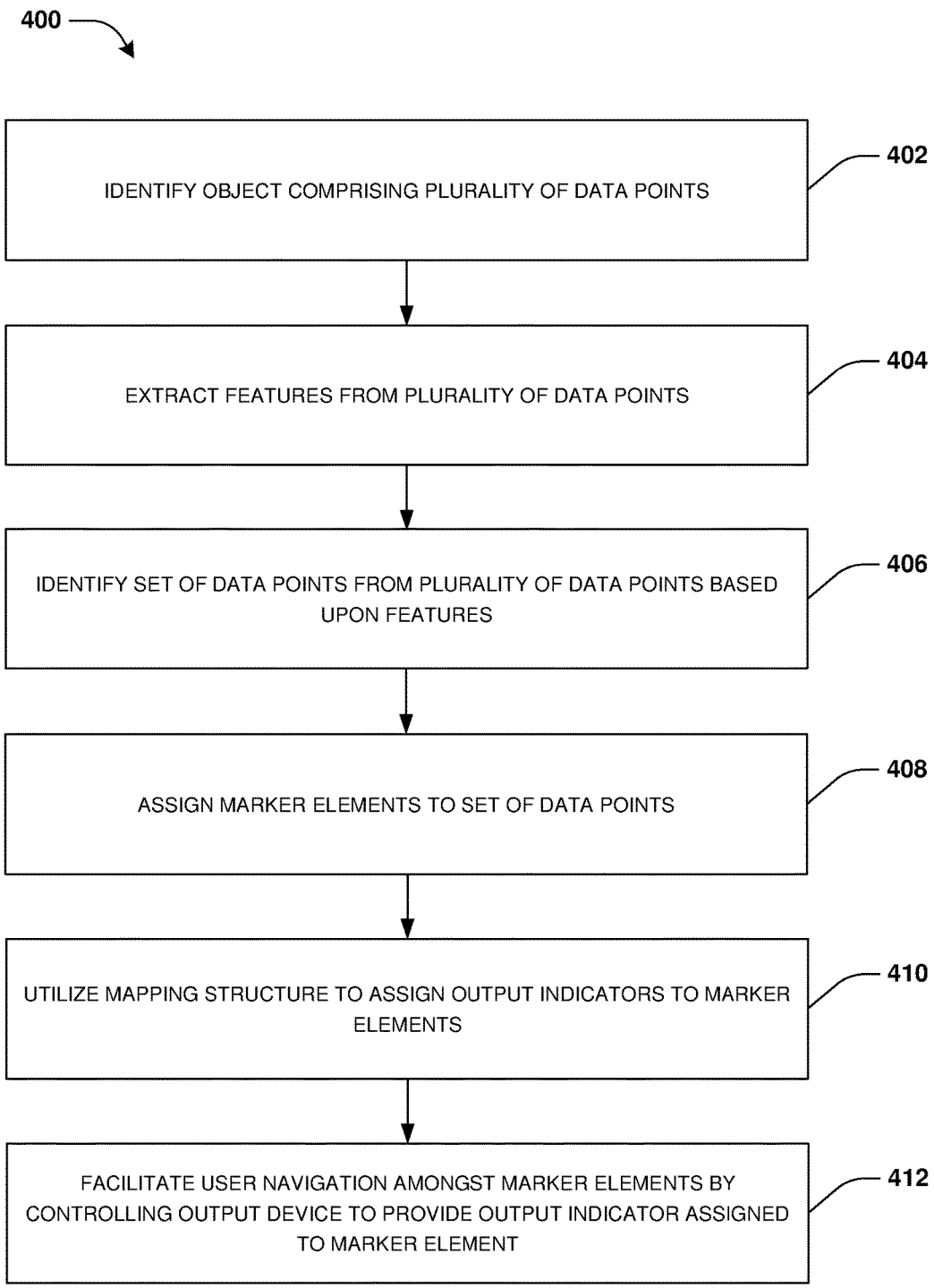
FIG. 4 is a flow chart illustrating an example method for controlling an output device.
Figure 5A:
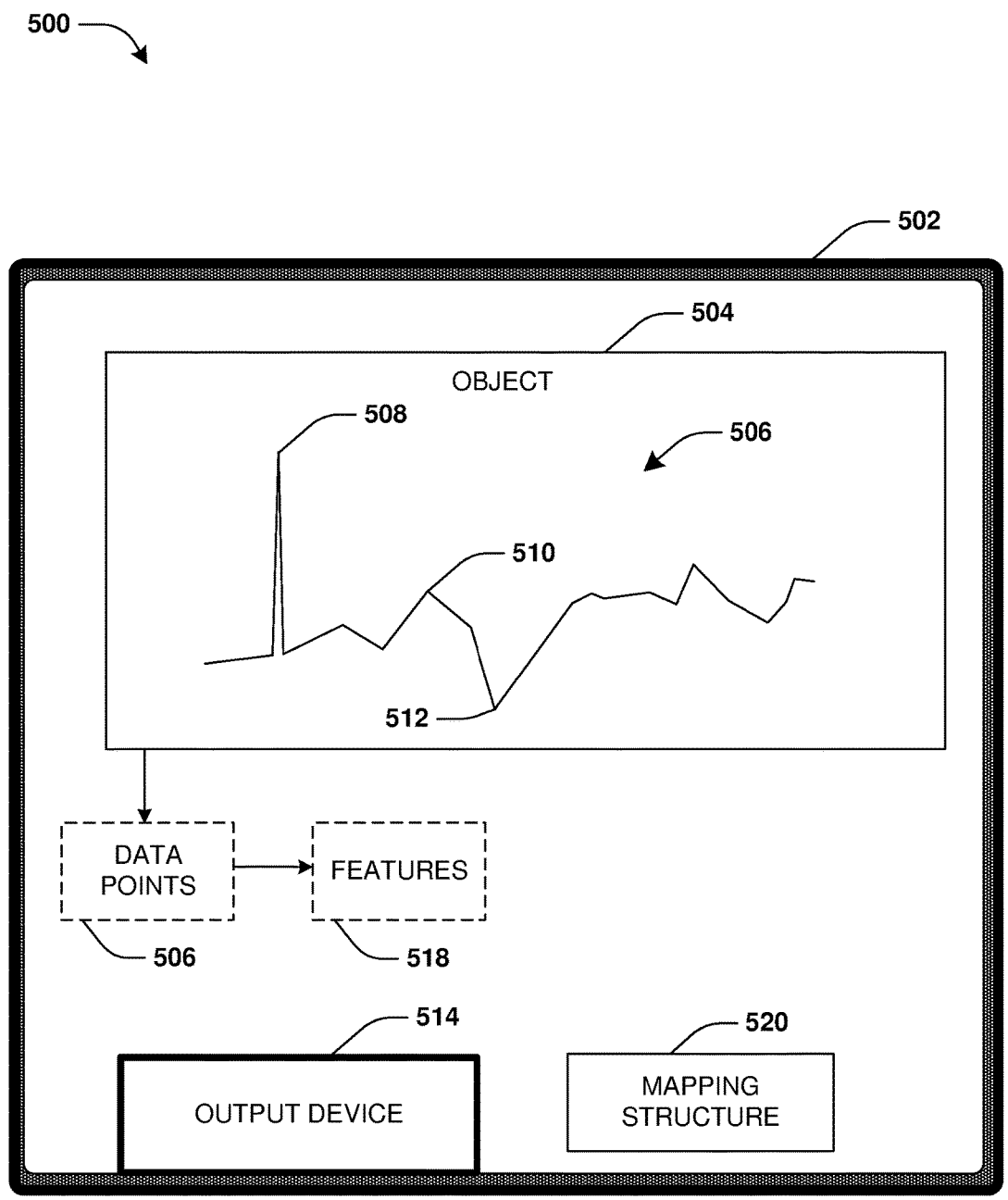
FIG. 5A is a component block diagram illustrating an example system for controlling an output device, where features are extracted from data points of an object.

An embodiment of controlling an output device is illustrated by an example method 400 of FIG. 4. At 402, an object 504, comprising a plurality of data points 506, is identified, as illustrated by system 500 of FIG. 5A. That is, a computing device 502 may store or provide access to the object 504, such as a chart, a graph, an image, a text document, a spreadsheet, a file, a user interface element, and/or any other type of data object with one or more datum points (e.g., one or more values). In one example, the object 504 may be identified based upon the object 504 being rendered through a user interface on a display of the computing device 502. Data of the user interface (e.g., data rendered through the user interface, data within a file from which the user interface is being executed, data of the user interface stored within memory, etc.) or metadata describing the user interface may be evaluated to identify the object 504. In another example, user signals of a user of the computing device 502 are evaluated to determine that the user has an interest in the object 504 (e.g., even if the object 504 is not currently being rendered through the display). The user signals may comprise a calendar entry (e.g., to check sports scores), an email (e.g., describing football stats a friend shared), a social network post (e.g., a post indicating that the user is writing a sport research paper), a routine activity of the user (e.g., checking sports scores every evening around 5:00 pm), a current location of the computing device 502 (e.g., located near a football stadium), etc. Such user signals may indicate that the user has an interest in a chart object of football sports scores and statistics accessible over a network from a remote device through a website.

Figure 5B:
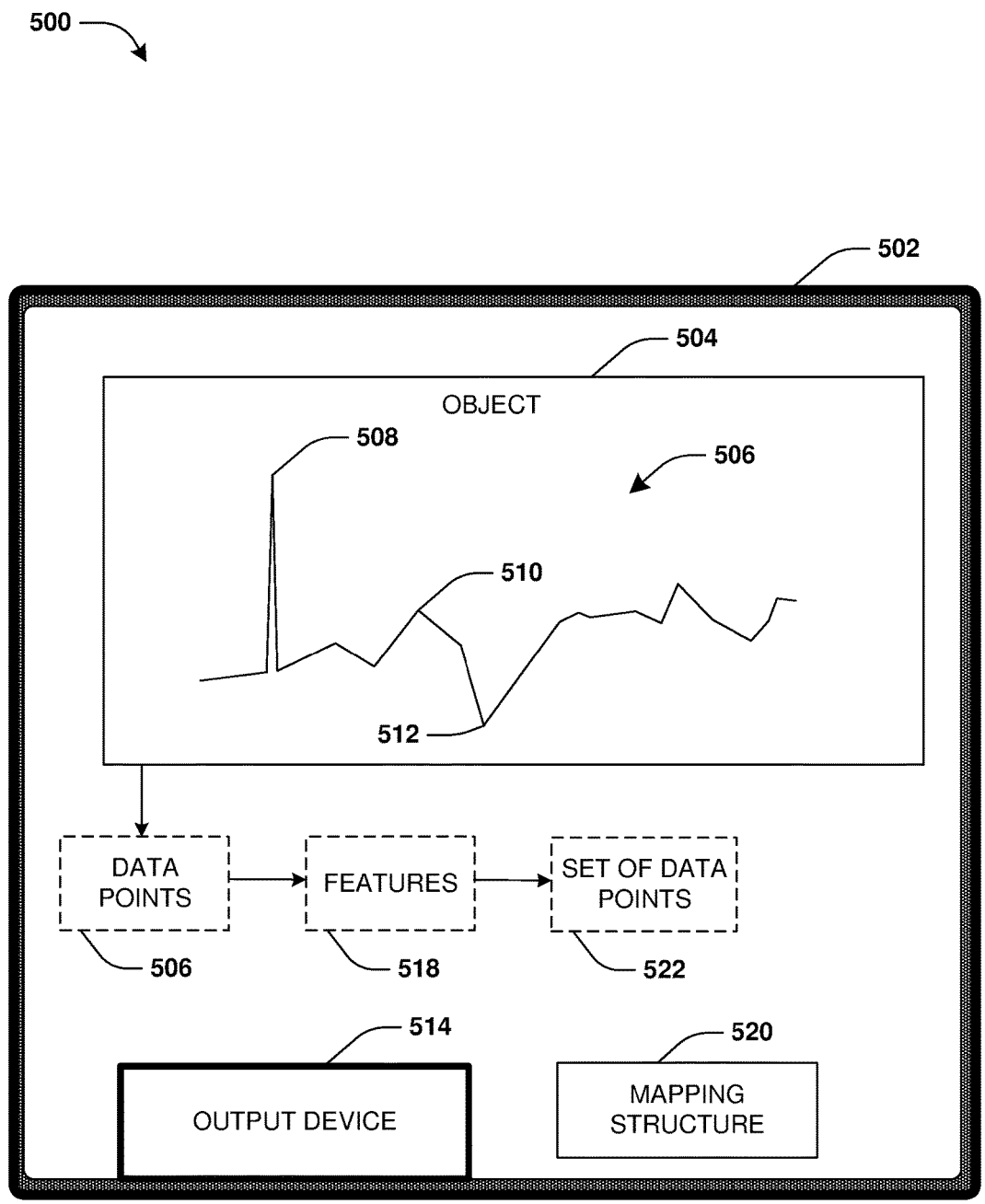
FIG. 5B is a component block diagram illustrating an example system for controlling an output device, where a set of data points are identified from data points of an object.

At 404, features 518 are extracted from the plurality of data points 506. The features 518 may correspond to various trends, values, or range of values that may be interesting, such as a maximum value 508, a minimum value 512, a change 510 from increasing values to decreasing values, negative values, positive values, outliers, etc. At 406, a set of data points 522 are identified from the plurality of data points 506 based upon the set of data points 522 having features 518 corresponding to target features, as illustrated by FIG. 5B. Target features may correspond to outliers, data points where values change from increasing values to decreasing values or vice versa, maximum values, minimum values, trends, etc.

Figure 5C:
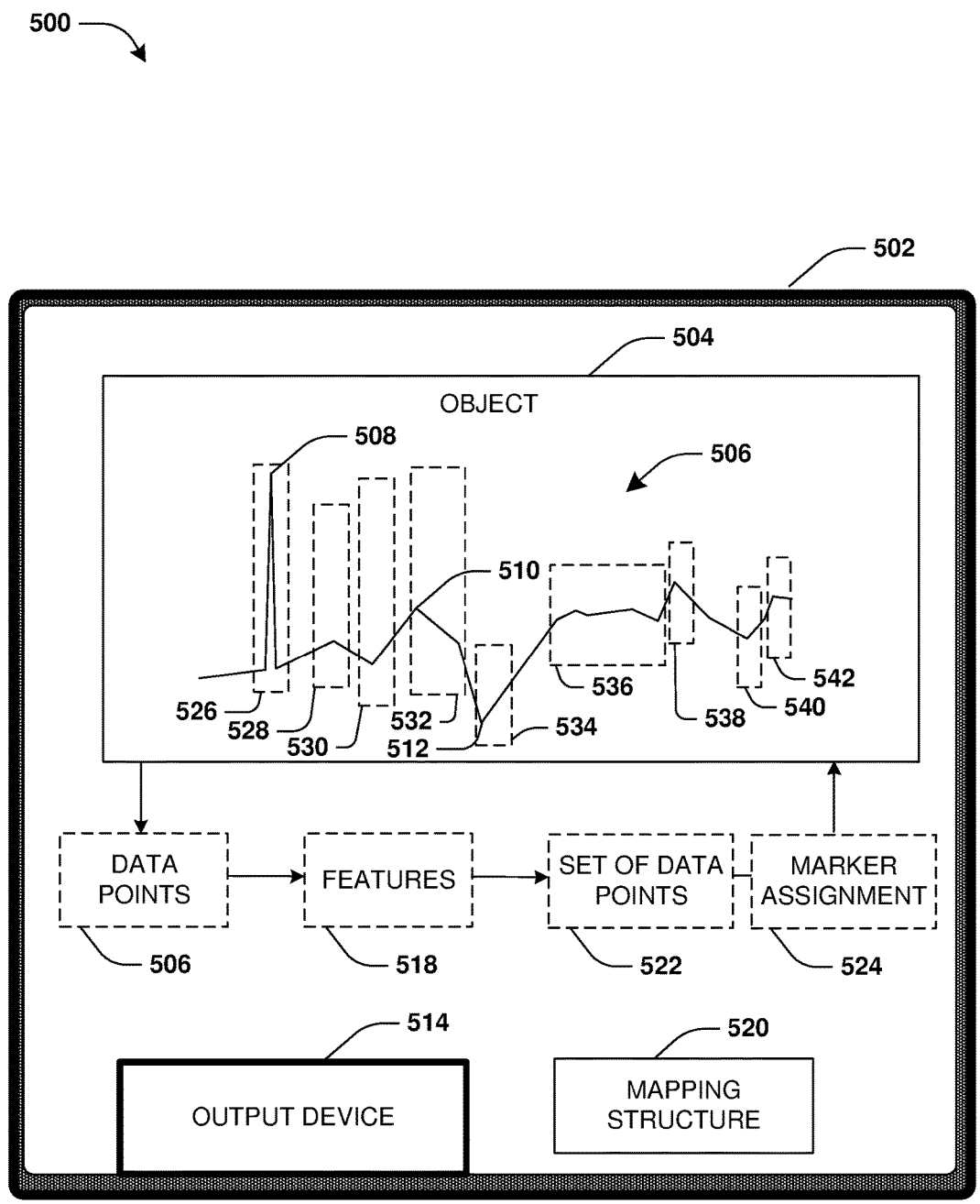
FIG. 5C is a component block diagram illustrating an example system for controlling an output device, where marker elements are assigned to data points.

At 408, marker elements are assigned 524 to the set of data points 522 within the object 504, as illustrated by FIG. 5C. In one example, marker elements are assigned 524 to each data point within the plurality of data points 506. In another example, marker elements are assigned 524 to a subset of the plurality of data points 506, such as to data points within the set of data points 522 that is a subset of the plurality of data points 506. For example, a first marker element 526 is assigned to one or more data points proximate to the maximum value 508, which may also correspond to an outlier feature. A second marker element 528 is assigned to a change in slope from increasing values to decreasing values. A third marker element 530 is assigned to a change in slope from decreasing values to increasing values. A fourth marker element 532 is assigned to a change in slope from increasing values to decreasing values. A fifth marker element 534 is assigned to one or more data points proximate to the minimum value 512. In this way, a variety of other marker elements, such as a sixth marker element 536, a seventh marker element 538, an eighth marker element 540, a ninth marker element 542, and/or other marker elements may be assigned to interesting data points or ranges of data points within the object 504. In one example, a marker element may comprise an invisible user interface element populated within the user interface through which the object 504 is renderable.

Figure 5D:
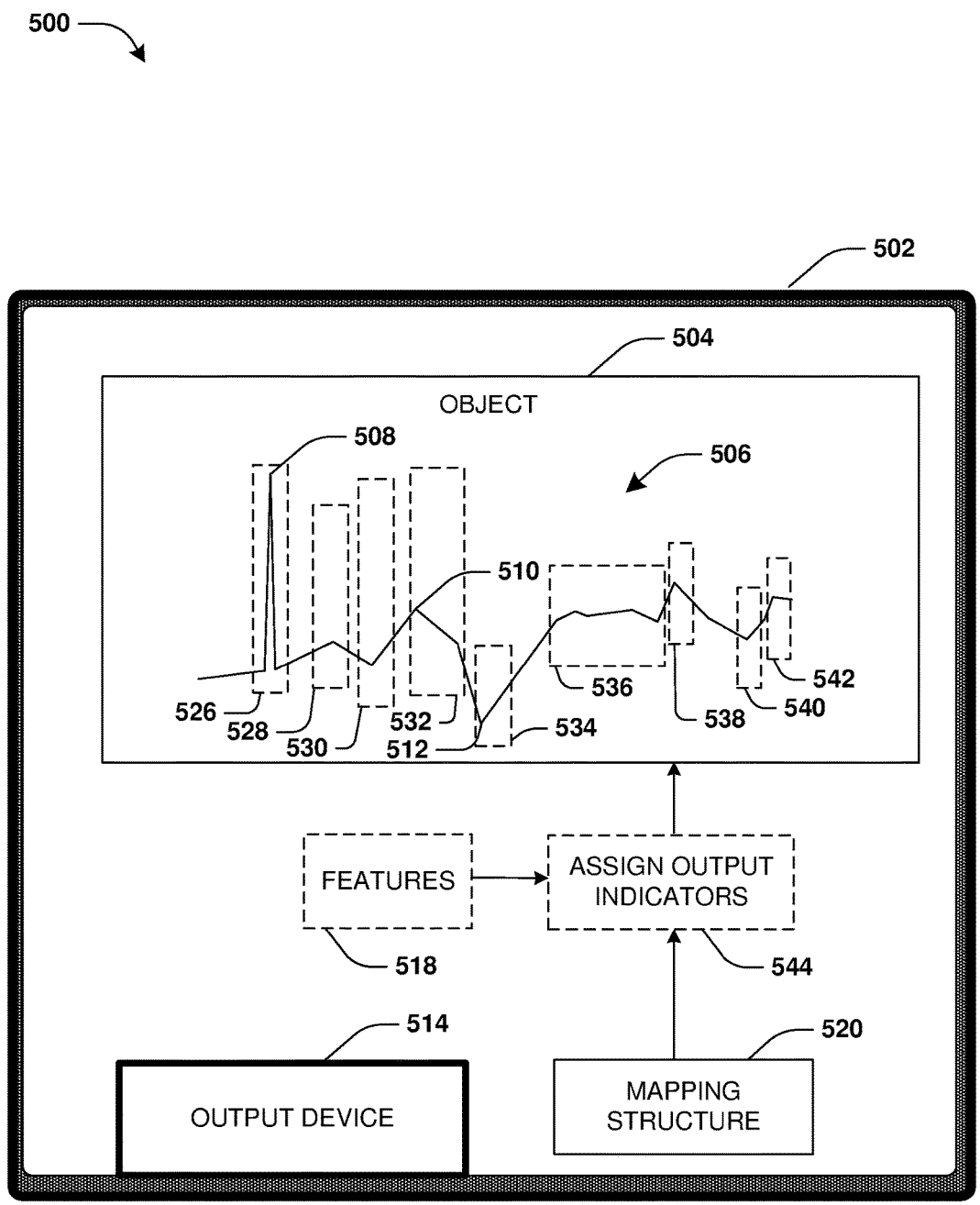
FIG. 5D is a component block diagram illustrating an example system for controlling an output device, where output indicators are assigned to marker elements.

At 410, a mapping structure 520 is used to assign 544 output indicators to marker elements based upon features 518 of data points to which the marker elements are assigned, as illustrated by FIG. 5D. The mapping structure 520 may map features to output indicators. For example, a type of output indicator may be an audio signal. Output indicators, such as the audio signals, can vary based upon various output features, such as a selected melody, a selected instrument, a selected tone, a selected type of echo, a selected volume, a selected pitch, a selected frequency, a selected texture, vibration intensity, vibration duration, or any other type of output feature that can be used to generate different output indicators signals.

Features of data points, such as values of data points, trends, slopes, changes from increasing to decreasing values or vice versa, negative values, positive values, maximum values, minimum values, types of data being represented (e.g., stock values, sports scores, bank account values, etc.), and/or other features can be mapped to particular output indicators such as audio signals having particular audio signal output features. For example, a sharp rise in stock values may be assigned to an output indicator with a particular instrument, volume, and frequency, whereas a sharp decline in stock values may be assigned to an output indicator with a different instrument, volume, and frequency. For sports scores, different volumes, instruments, and/or other types of output features may be used compared to output features of output indicators used to represent stock values or other types of values. In another example, if output indicators are a different type of output such as haptic device vibrations, then different vibration intensities, vibration lengths, etc. can be used to represent different types of data points (e.g., sports scores compared to stock values) and/or data points having different types of features (e.g., a minimum value compared to an outlier).

Figure 5E:
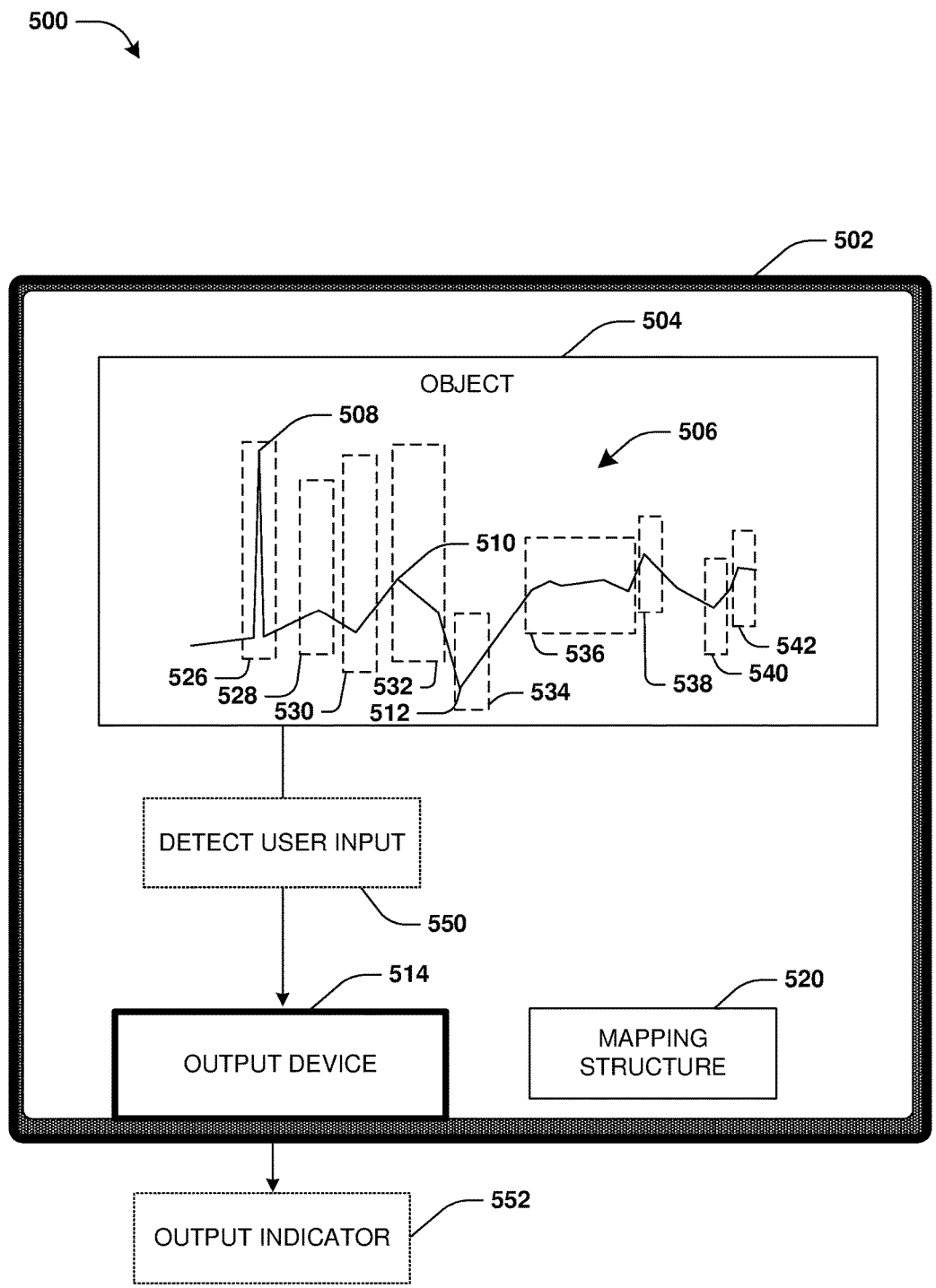
FIG. 5E is a component block diagram illustrating an example system for controlling an output device, where an output indicator is provided.

At 412, user navigation is facilitated among the marker elements, as illustrated in FIG. 5E. User navigation can correspond to touch input on a touch screen (e.g., a swipe gesture), voice commands, mouse input, keyboard input, eye movement, body movement (e.g., within a virtual reality or augmented reality environment), and/or a variety of other types of input. For example, user input 550 of a user swiping a finger across the user interface through which the object 504 is rendered may be detected. As the user navigates among the marker elements, marker elements will come into a current focus (e.g., a marker element underneath a finger of the user that the user is using to swipe through data points of the object 504). An output device 514, such as an audio device, is controlled to provide output indicators assigned to marker elements as the marker elements become the current focus of the user input, such as an output indicator 552 of a marker element underneath the finger of the user. The output indicator 552 may correspond to an audio signal, a modification applied to a song or melody already being played, a vibration of a haptic device, output provided through an augmented reality or virtual reality environment, etc.

In one example, a display location of the marker element that is the current focus is determined (e.g., x/y coordinates). One or more haptic devices of a haptic device array that are proximate to the display location are identified. The haptic device array is controlled to provide the output indicator 552 by invoking the one or more haptic devices proximate to the display location to activate, such as to vibrate.

In one example, an indicator of a last accessed marker element is maintained. In response to determining a context change from a user interface associated with the object 504 to a second user interface (e.g., the user navigates from the user interface through which the object 504 is rendered to a different user interface such as a web browser interface, a game interface, an email app interface, etc.), the indicator may be persisted to storage, such as to memory, a storage device, etc. In response to determining a second context change to the user interface associated with the object 504, the indicator may be extracted from the storage. The current focus is set to the last accessed marker element (e.g., the last accessed marker element is brought into focus where the finger of the user is currently positioned, and a zoom level, such as a macro view or micro view, of the object 504 may be restored).

Figure 6A:
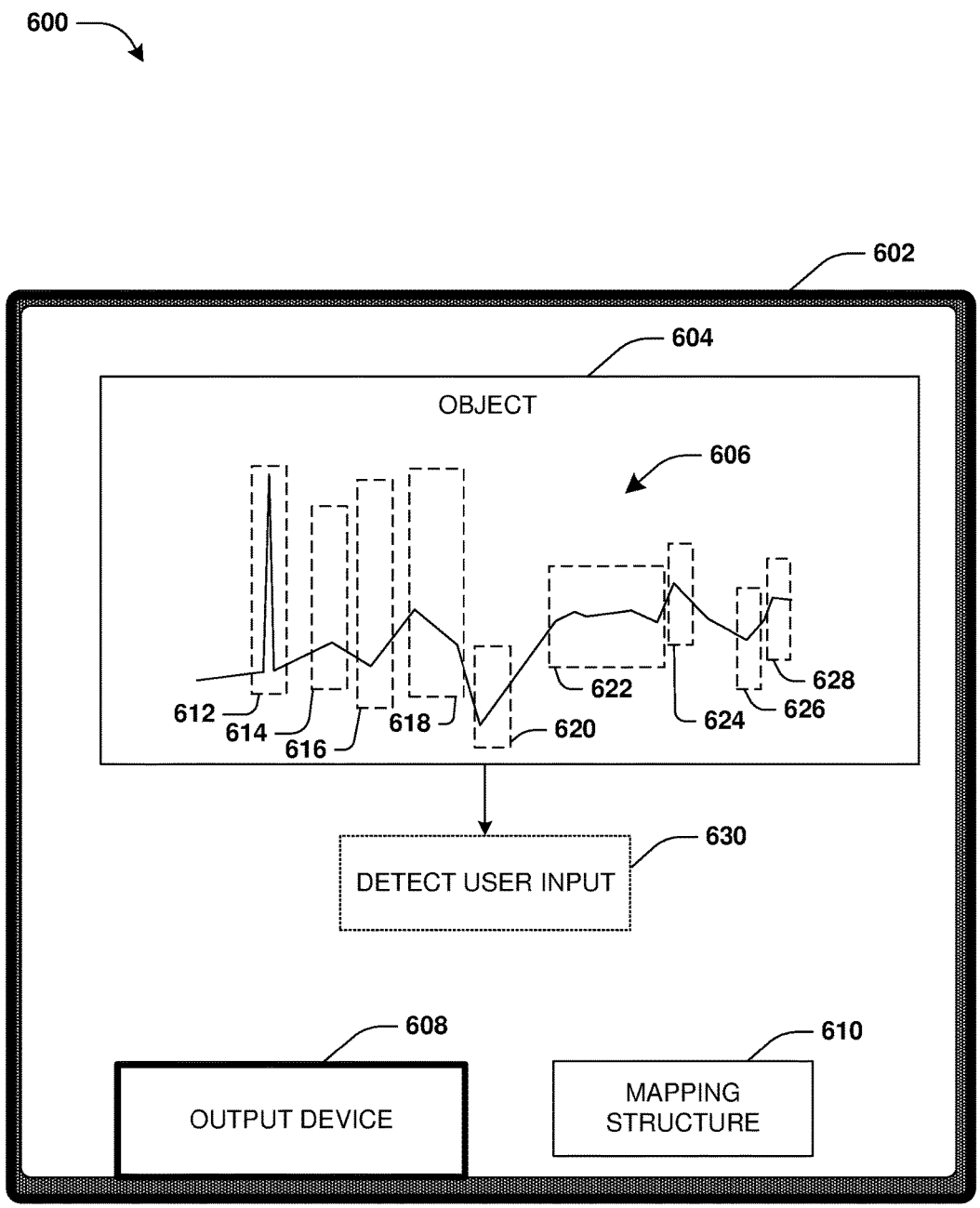
FIG. 6A is a component block diagram illustrating an example system for controlling an output device, where user navigation is detected.
Figure 6B:
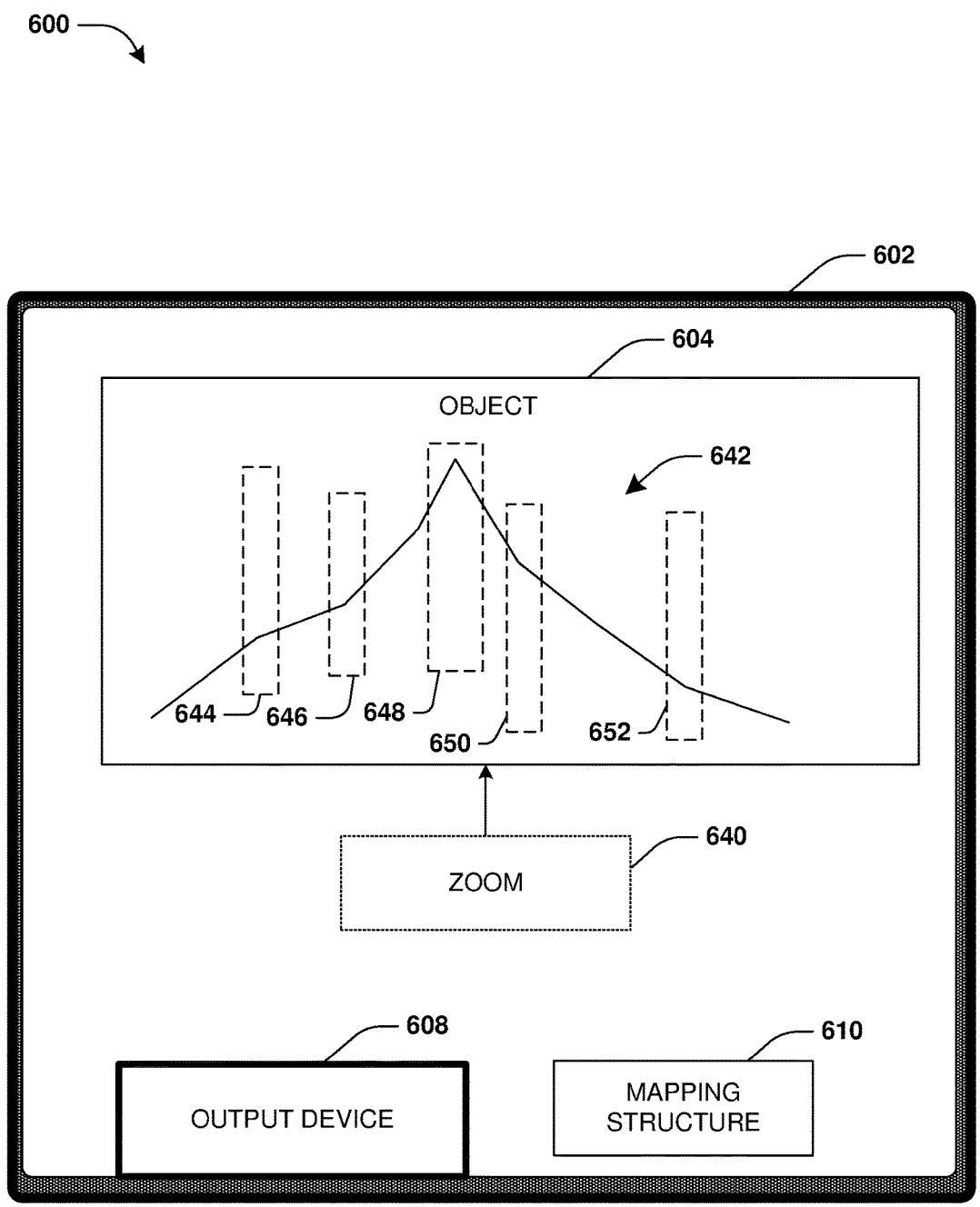
FIG. 6B is a component block diagram illustrating an example system for controlling an output device, where an object is zoomed into a micro view of the object.

User navigation may be tracked to determine whether the user wants to zoom into a finer granularity of data points or zoom out to a more coarse granular view of the data points, as illustrated by the example system 600 of FIGS. 6A-6B. For example, a computing device 602 may render a graph object 604 through a user interface at a first level of granularity 606. The graph object 604 may represent thousands of data points, and thus the first level of granularity 606 may represent a sampling of data points (e.g., display of a line as opposed to a display of thousands of individual data points). A first marker element 612, a second marker element 614, a third marker element 616, a fourth marker element 618, a fifth marker element 620, a sixth marker element 622, a seventh marker element 624, an eighth marker element 626, and a ninth marker element 628 are assigned to data points or ranges of data points within the graph object 604. Output indicators are assigned to the marker elements using the mapping structure 610 based upon features of data points to which the marker elements are assigned. In this way, an output device 608 is controlled to provide output indicators as the user navigation encounters marker elements.

In one example, user navigation is detected 630 within the graph object 604, as illustrated by FIG. 6A. The user navigation may be indicative of the user wanting to zoom 640 into a region of the graph object 604 in order to view a finer granularity of data points within the region (e.g., the user starts to slow down scrolling through the data points or stops on a particular data point or marker element). Display of the graph object 604 may be updated according to a second level of granularity 642 corresponding to a zoomed in view of the region, such as to display a micro scale object comprising a second set of data points, as illustrated by FIG. 6B. A first micro marker element 644, a second micro marker element 646, a third micro marker element 648, a fourth micro marker element 650, and a fifth micro marker element 652 are assigned to data points within the second set of data points. The mapping structure 610 is used to assign output indicators to the first micro marker element 644, the second micro marker element 646, the third micro marker element 648, the fourth micro marker element 650, and the fifth micro marker element 652 based upon features of data points to which micro marker elements are assigned. The output device 608 is controlled to provide output indicators assigned to the micro marker elements as the micro marker elements become the current focus of the user navigation.

In another example, an input speed of the user navigation is determined. In response to the input speed exceeding a threshold speed (e.g., the user is scrolling quickly through the graph object 604), a macro scale object comprising a second set of data points from the plurality of data points is generated. The second set of data points may comprise a coarser macro view of the graph object 604. Macro marker elements are assigned to the second set of data points based upon features of data points within the second set of data points. The mapping structure 610 is used to assign output indicators to the macro marker elements based upon features of data points to which macro marker elements are assigned. The output device 608 is controlled to provide output indicators assigned to the macro marker elements as the macro marker elements become the current focus of the user navigation.

In another example, a current input speed of the user navigation is determined. In response to the current input speed falling below a threshold speed (e.g., the user starts to slowly scroll through the graph object 604), a micro scale object comprising a third set of data points from the plurality of data points is generated. The third set of data points may comprise a finer micro view of the graph object 604. Micro marker elements are assigned to the third set of data points based upon features of data points within the third set of data points. The mapping structure 610 is used to assign output indicators to the micro marker elements based upon features of data points to which micro marker elements are assigned. The output device 608 is controlled to provide output indicators assigned to the micro marker elements as the micro marker elements become the current focus of the user navigation.

Figure 7:
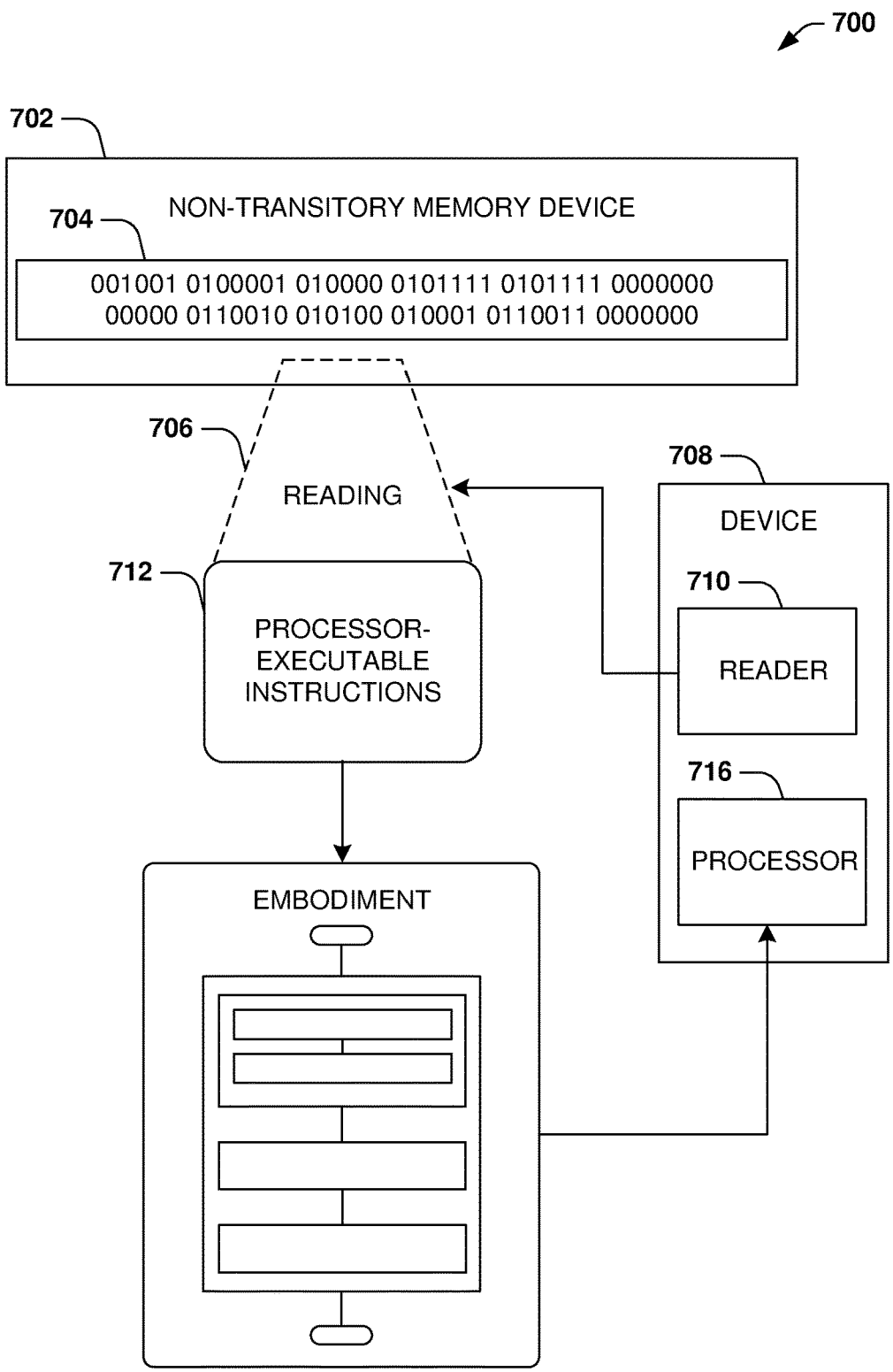
FIG. 7 is an illustration of a scenario featuring an example non-transitory machine readable medium in accordance with one or more of the provisions set forth herein.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein. The non-transitory machine readable medium 702 may comprise a memory semiconductor (e.g., a semiconductor using static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 702 stores computer-readable data 704 that, when subjected to reading 706 by a reader 710 of a device 708 (e.g., a read head of a hard disk drive, or a read operation invoked on a solid-state storage device), express the processor-executable instructions 712. In some embodiments, the processor-executable instructions 712, when executed cause performance of operations, such as at least some of the example method 400 of FIG. 4, for example. In some embodiments, the processor-executable instructions 712 are configured to cause implementation of a system, such as at least some of the example system 500 of FIGS. 5A-5E and/or at least some of the example system 600 of FIGS. 6A-6B, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or." In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method of controlling an output device, comprising:
   identifying an object comprising a plurality of data points;
   extracting features from the plurality of data points;
   identifying a set of data points from the plurality of data points based upon the set of data points having features corresponding to target features;
   assigning marker elements to the set of data points;
   using a mapping structure, mapping features to output indicators, to assign output indicators to marker elements; and
   facilitating user navigation among the marker elements, wherein the facilitating user navigation comprises:
      determining an input speed of the user navigation; and
      at least one of:
         in response to the input speed exceeding a first threshold speed:
            generating a macro scale object comprising a second set of data points from the plurality of data points;
            assigning macro marker elements to the second set of data points;
            using the mapping structure to assign first output indicators to the macro marker elements; and
            controlling an output device to provide at least one of the first output indicators assigned to the macro marker elements as the macro marker elements become a current focus of the user navigation; or
         in response to the input speed falling below a second threshold speed:
            generating a micro scale object comprising a third set of data points from the plurality of data points;
            assigning micro marker elements to the third set of data points;
            using the mapping structure to assign second output indicators to the micro marker elements; and
            controlling the output device to provide at least one of the second output indicators assigned to the micro marker elements as the micro marker elements become the current focus of the user navigation.

2. The method of claim 1, comprising:
   assigning audio signal features to at least one of the output indicators based upon values of data points within the object.

3. The method of claim 1, wherein the first threshold speed is the same as the second threshold speed.

4. The method of claim 1, wherein the first threshold speed is different than the second threshold speed.

5. The method of claim 1, comprising:
maintaining an indicator of a last accessed marker element; and
in response to determining a context change from a user interface associated with the object to a second user interface, persisting the indicator into memory.

6. The method of claim 5, comprising:
in response to determining a second context change to the user interface associated with the object, extracting the indicator from the memory; and
setting the current focus to the last accessed marker element.

7. The method of claim 1, wherein a marker element comprises an invisible user interface element populated within a user interface.

8. The method of claim 1, wherein an output indicator provided via the output device comprises an audio signal.

9. The method of claim 8, wherein the audio signal comprises at least one of a selected melody from a set of melodies, a selected tone from a set of tones, a selected pitch from a set of pitches, a selected frequency from a set of frequencies, a selected amplitude from a set of amplitudes, a selected texture from a set of textures, a selected instrument from a set of instruments, or an echo.

10. A computing device comprising:
a processor; and
memory comprising processor-executable instructions that when executed by the processor cause performance of operations, the operations comprising:
identifying an object, within a user interface rendered on a display of the computing device, comprising a plurality of data points;
extracting features from the plurality of data points;
identifying a set of data points from the plurality of data points based upon the set of data points having features corresponding to target features;
assigning marker elements to the set of data points;
using a mapping structure, mapping features to output indicators, to assign output indicators to marker elements; and
facilitating user navigation through the user interface among the marker elements, wherein the facilitating user navigation comprising:
determining an input speed of the user navigation; and
in response to the input speed exceeding a threshold speed:
generating a macro scale object comprising a second set of data points from the plurality of data points;
assigning macro marker elements to the second set of data points;
using the mapping structure to assign one or more output indicators to the macro marker elements; and
controlling an output device to provide at least one of the one or more output indicators assigned to the macro marker elements as the macro marker elements become a current focus of the user navigation.

11. The computing device of claim 10, wherein the operations comprise:
providing an output indicator through a virtual reality environment hosted by the computing device through the user interface.

12. The computing device of claim 11, wherein the object is rendered within the virtual reality environment through the user interface.

13. The computing device of claim 10, wherein the operations comprise:
providing an output indicator through an augmented reality environment hosted by the computing device.

14. The computing device of claim 10, wherein the object is rendered within an augmented reality environment through the user interface.

15. The computing device of claim 10, wherein the operations comprise:
determining a display location of at least one marker element that is the current focus within the user interface;
identifying one or more haptic devices of a haptic device array that are proximate to the display location; and
controlling the haptic device array to provide an output indicator by invoking the one or more haptic devices to activate.

16. A non-transitory machine readable medium having stored thereon processor-executable instructions that when executed cause performance of operations, the operations comprising:
identifying an object comprising a plurality of data points;
extracting features from the plurality of data points;
identifying a set of data points from the plurality of data points based upon the set of data points having features corresponding to target features;
assigning marker elements to the set of data points;
using a mapping structure, mapping features to output indicators, to assign output indicators to marker elements; and
facilitating user navigation among the marker elements, wherein the facilitating user navigation comprising:
determining an input speed of the user navigation; and
in response to the input speed falling below a threshold speed:
generating a micro scale object comprising a second set of data points from the plurality of data points;
assigning micro marker elements to the second set of data points;
using the mapping structure to assign one or more output indicators to the micro marker elements; and
controlling an output device to provide at least one of the one or more output indicators assigned to the micro marker elements as the micro marker elements become a current focus of the user navigation.

17. The non-transitory machine readable medium of claim 16, wherein the operations to identify an object comprise operation for:
evaluating one or more user signals to determine that a user of a computing device has an interest in the object.

18. The non-transitory machine readable medium of claim 16, wherein the operations to identify an object comprise operation for:
identify a user interface rendered on a display of a computing device; and
evaluating at least one of data or metadata of the user interface to identify the object.

19. The non-transitory machine readable medium of claim 16, wherein the one or more output indicators comprise audio signals played through an audio device of a computing device having access to the object.

20. The non-transitory machine readable medium of claim 16, comprising:
assigning audio signal features to at least one of the output indicators based upon values of data points within the object, wherein an audio signal feature corresponds to at least one of a melody, an instrument, a tone, an echo, a volume, a pitch, a frequency, or a texture.

* * * * *